United States Patent [19]
Williamson et al.

[11] 4,181,435
[45] Jan. 1, 1980

[54] HOLOGRAPHIC FIELD LENS DETECTOR

[75] Inventors: Tommy L. Williamson, Kettering; Harold W. Rose, Xenia, both of Ohio

[73] Assignee: The United States of America as represented by the Secretary of the Air Force, Washington, D.C.

[21] Appl. No.: 373,527

[22] Filed: Jun. 29, 1973

[51] Int. Cl.² .......................... G01B 11/26; G02B 5/18
[52] U.S. Cl. ..................................... 356/141; 350/3.72; 350/162 ZP; 356/152
[58] Field of Search ................. 356/141, 152; 350/3.5, 350/162 ZP, 3.72

[56] References Cited
U.S. PATENT DOCUMENTS

| | | | |
|---|---|---|---|
| 3,375,750 | 4/1968 | Ellis et al. | 356/152 |
| 3,478,219 | 11/1969 | Nutz | 356/152 |
| 3,701,602 | 10/1972 | Bergin et al. | 356/152 |

OTHER PUBLICATIONS

Sincerbox, IBM Tech. Discl. Bulletin, 8-1967, pp. 267, 268.

*Primary Examiner*—S. C. Buczinski
*Attorney, Agent, or Firm*—Joseph E. Rusz; Richard J. Killoren

[57] ABSTRACT

A holographic field lens detector system having an objective lens for focusing incoming light from a distant illuminating source upon a holographic lens positioned at the back focal plane of the objective lens. The aperture of the objective lens is simultaneously imaged on four detectors positioned in back of the holographic lens and on the four sides of holographic lens. The output of opposite pairs of detectors are fed to sum and difference circuits with the output of the sum and difference circuits being supplied to divide circuits to provide X and Y position information for the illumination on the holographic lens.

2 Claims, 5 Drawing Figures

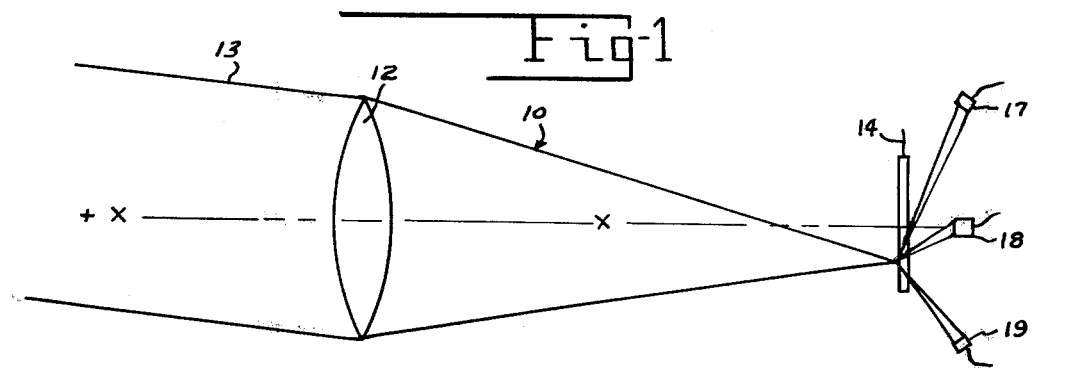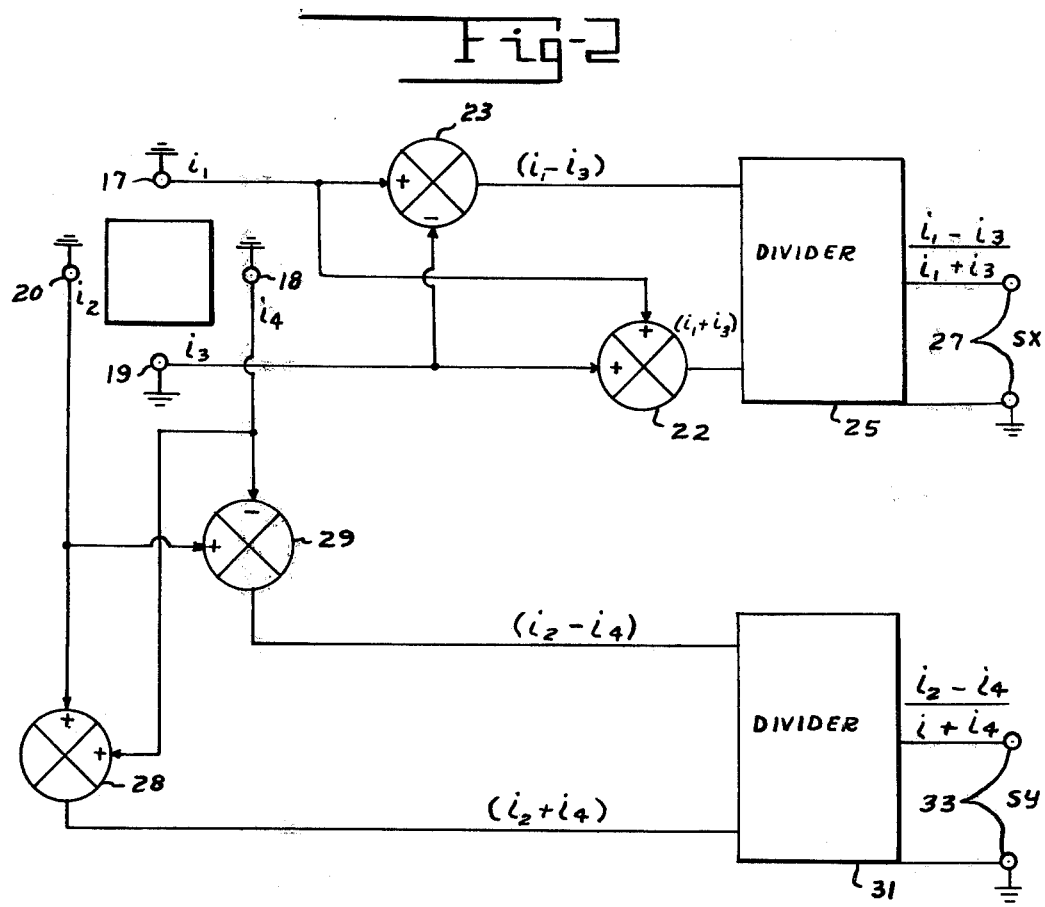

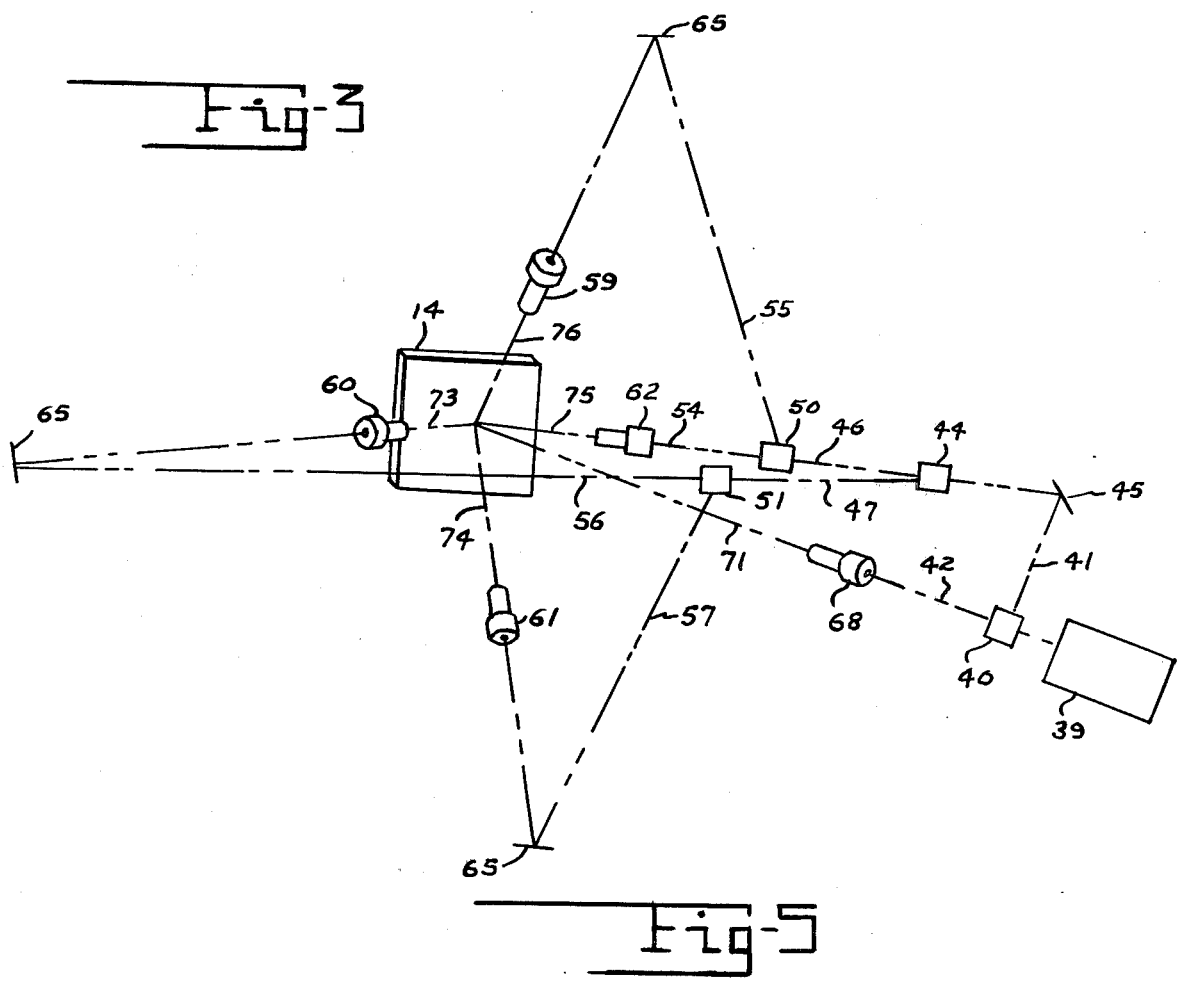
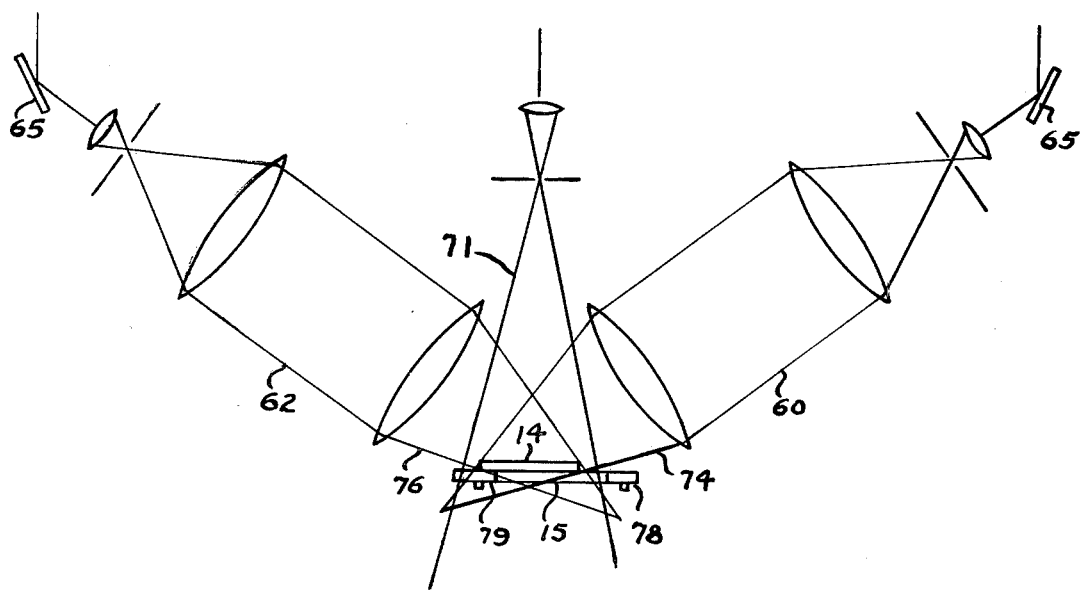

HOLOGRAPHIC FIELD LENS DETECTOR

BACKGROUND OF THE INVENTION

In some prior art quadrant detectors, use is made of area detectors. However, the use of area detectors is less desirable than the use of high quality point detectors presently available in the art. One system that makes use of point detectors, in a quadrant detector system, is described in our copending application "Quadrant Detection System", Ser. No. 369,030 filed June 8, 1973. However, in the quadrant detection system described in our copending patent application the quadrant holographic lens elements each have only a single image position. Thus, an output signal will be provided from only one detector at a time and the information provided indicates only the quadrant in which the signal appears.

BRIEF SUMMARY OF THE INVENTION

According to this invention, a detector system is provided which not only indicates the quadrant in which the signal appears but will also provide X and Y position information about the signal. The holographic lens of this invention is made to have multiple image points. Such a lens made for use in a quadrant detector system will have four image points which correspond to four point detectors such as used in the device described in our copending patent application, referenced above.

IN THE DRAWINGS

FIG. 1 is a schematic diagram showing a holographic field lens detector system according to the invention.

FIG. 2 is a schematic block diagram of the circuit used with the device of FIG. 1.

FIG. 3 is a schematic view of one system used for making the holographic lens of the device of FIG. 1.

FIG. 5 is a schematic diagram showing another system which may be used for making the holograph lens used in the device of FIG. 1.

DETAILED DESCRIPTION OF THE INVENTION

Figure 4:
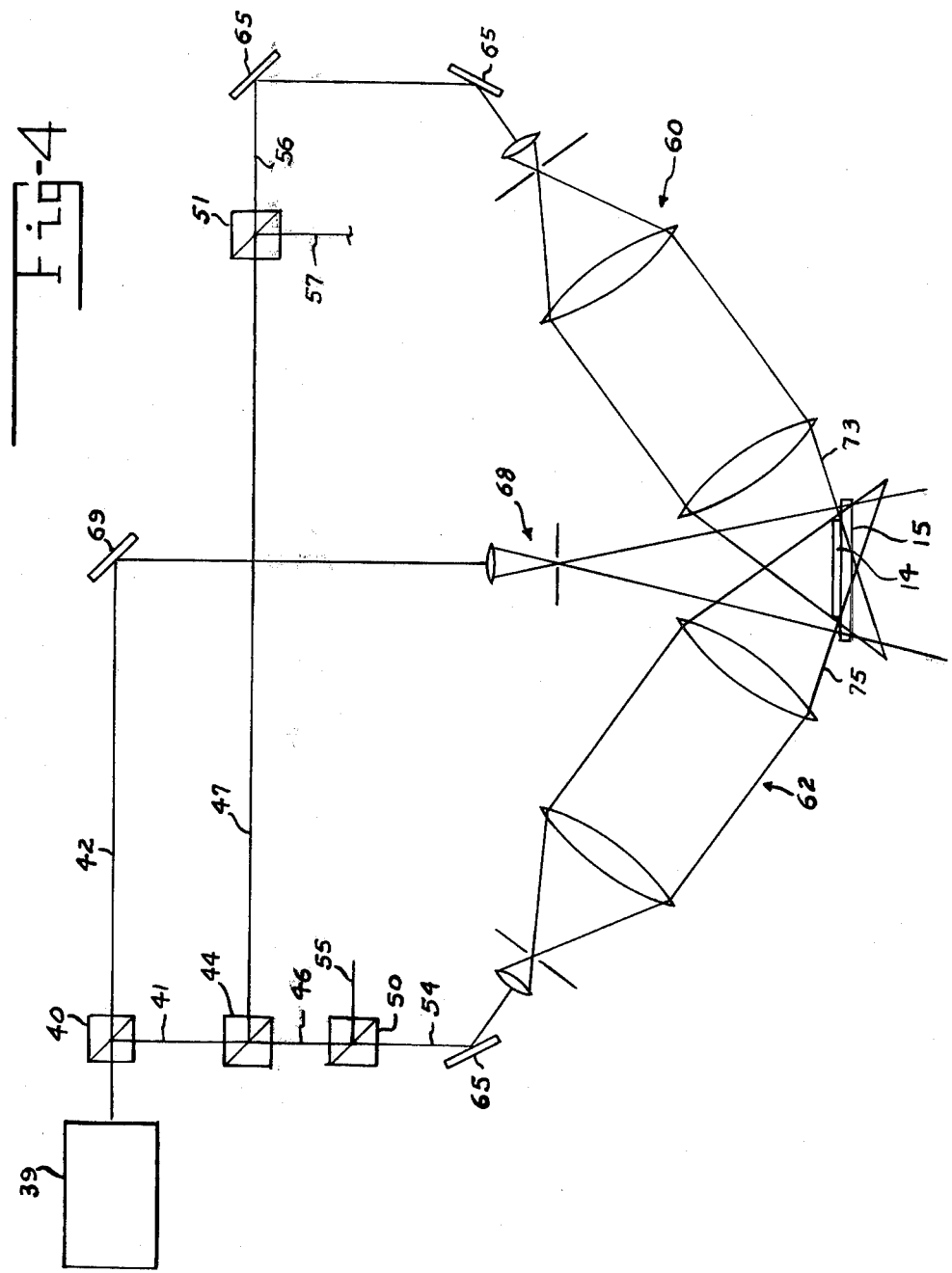
FIG. 4 shows the optical system for illuminating the holographic lens for one dimension in the device of FIG. 3.

Reference is now made to FIG. 1 of the drawing, which shows a quadrant detector system 10 having an objective lens 12, which collects light from a distant illuminating source, not shown, such that the incoming wave front is essentially collimated, as shown at 13. The incoming light is focused at the back focal plane of lens 12. A holographic lens element 14 is positioned approximately at the back focal plane of lens 12. The illumination from the distant source appears as an illuminated spot of light on the holographic lens element. Detectors 17, 18, 19 and 20 are positioned in back of and around the periphery of the holographic lens element 14. The aperture of the lens 12 is simultaneously imaged on the detectors 17, 18, 19 and 20 with the spot size on the detectors being proportional to the X and Y position of the spot on the lens element 14. Since the spot position is a function of the angle of the collimated light reaching lens 12, the output of detectors 17, 18, 19 and 20 may be used to provide very accurate angular information about the distant illuminating source.

The outputs of the detectors 17 and 19 are fed to conventional sum and difference circuits 22 and 23 with the output of these circuits being supplied to a conventional divide circuit 25 to provide an X output signal at 27. The outputs of the detectors 18 and 20 are fed to sum and difference circuits 28 and 29 with the output of these circuits being supplied to conventional divide circuit 31 to provide a Y output signal at 33.

The holographic lens may be constructed as shown in FIG. 3, wherein light from laser source 39 is supplied to a beam splitter 40 to provide two beams 41 and 42. The beam 41 is then supplied to a second beam splitter 44 through mirror 45 to provide two beams 46 and 47. Beams 46 and 47 are then supplied to beam splitters 50 and 51 to provide four beams 54, 55, 56 and 57. The beams 54, 55, 56 and 57 are then directed through optical systems 59, 60, 61 and 62, shown in greater detail in FIG. 4 by means of reflectors 65 where needed.

The beam 42 is directed through optical system 68 to provide a reference beam 71.

As shown in FIG. 4, the optical systems 60 and 62 provide converging beams for illuminating the hologram 14 on support 15 and the optical system 68 provides a diverging beam for illuminating the hologram 14. Systems 59 and 61 will provide like illumination in the vertical direction.

While the signal beams 73, 74, 75 and 76 are illustrated in FIG. 4 as being converging beams and beam 71 is illustrated as being a diverging beam it is to be understood that the holographic lens could also be constructed by making beams 73, 74, 75 and 76 diverging beams with beam 71 being made a converging beam.

Also, though a four signal beam system is shown in the device of FIGS. 3 and 4, the system shown in FIG. 5 could be used for making the holographic lens. In this device, only two signal beams 60 and 62 are provided and the support 15 may be rotated 90 degrees on a plurality of rollers, two of which are shown at 78 and 79, after a first exposure to be again exposed.

While the system has been described as having spot size on the detectors proportional to the X and Y position of the spot on the element 14, it has been found that the transmitting efficiency of the holographic lens for light reaching the different detectors is a function of the spot position on the holographic lens. Use can also be made of this property in the detector system of the invention.

Since the angular position of the imaging of the aperture of the objective lens by the holographic lens element is wave length dependent, a plurality of angularly spaced detectors may be positioned on each side of the holographic lens element to provide different indications for different wave lengths of incoming light.

There is thus provided a holographic detector system which will provide X and Y position information for incoming light reaching the holographic lens element.

We claim:

1. A detection system for providing X and Y directional information concerning illumination reaching the detecting system from a distant source comprising: an objective lens adapted to receive said illumination; a plurality of photoelectric point detectors equally spaced around the optic axis of said lens in a plane perpendicular to said optic axis; a holographic element positioned in the back focal plane of said objective lens between the objective lens and the photoelectric detectors whereby said illumination is brought to a spot on the holographic element; said holographic element including means for imaging the energy from the aperture of said objective lens simultaneously onto the separate photodetectors with the energy on each detector being a function of the position of the spot on the holographic element and means responsive to the output of said detectors for providing an X output signal and a Y output signal.

2. The device as recited in claim 1 wherein there are four photoelectric detectors positioned around the periphery of the holographic element.